(12) United States Patent
Oishi et al.

(10) Patent No.: US 7,187,507 B2
(45) Date of Patent: Mar. 6, 2007

(54) OPTICAL COMPONENT AND LASER IRRADIATION APPARATUS

(75) Inventors: Hirotada Oishi, Atsugi (JP); Tomoaki Moriwaka, Atsugi (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 22 days.

(21) Appl. No.: 10/852,140

(22) Filed: May 25, 2004

(65) Prior Publication Data

US 2004/0240086 A1   Dec. 2, 2004

(30) Foreign Application Priority Data

May 28, 2003   (JP)   ............... 2003-150989

(51) Int. Cl.
    *G02B 7/02*   (2006.01)
(52) U.S. Cl. .................. 359/819; 359/811; 359/818
(58) Field of Classification Search ................. 359/819
    See application file for complete search history.

(56) References Cited

U.S. PATENT DOCUMENTS

| | | | |
|---|---|---|---|
| 2,238,919 A * | 4/1941 | Splaine ..................... 351/109 |
| 5,712,191 A | 1/1998 | Nakajima et al. ............ 438/487 |
| 5,886,837 A * | 3/1999 | Legare et al. ................ 359/827 |
| 5,900,980 A | 5/1999 | Yamazaki et al. ........... 359/619 |
| 6,104,535 A | 8/2000 | Tanaka ........................ 359/619 |
| 6,137,633 A | 10/2000 | Tanaka ........................ 359/619 |
| 6,144,426 A | 11/2000 | Yamazaki et al. ............ 349/95 |
| 6,157,492 A | 12/2000 | Yamazaki et al. ........... 359/623 |
| 6,160,827 A | 12/2000 | Tanaka ......................... 372/24 |
| 6,176,926 B1 | 1/2001 | Tanaka ......................... 117/92 |
| 6,215,595 B1 | 4/2001 | Yamazaki et al. ........... 359/623 |
| 6,304,385 B1 | 10/2001 | Tanaka ........................ 359/619 |
| 6,388,812 B2 | 5/2002 | Yamazaki et al. ........... 359/623 |
| 6,516,009 B1 | 2/2003 | Tanaka ......................... 372/24 |
| 6,567,219 B1 | 5/2003 | Tanaka ........................ 359/624 |
| 6,587,277 B2 | 7/2003 | Yamazaki et al. ........... 359/623 |
| 6,660,609 B2 | 12/2003 | Tanaka et al. ............... 438/378 |
| 6,678,023 B1 | 1/2004 | Yamazaki et al. ............ 349/95 |
| 6,728,048 B2 * | 4/2004 | Takase ......................... 359/819 |
| 6,765,175 B2 | 7/2004 | Tanaka et al. ........... 219/121.73 |
| 6,841,797 B2 | 1/2005 | Isobe et al. .................... 257/64 |
| 6,847,006 B2 | 1/2005 | Yamazaki et al. ...... 219/121.76 |
| 6,849,825 B2 | 2/2005 | Tanaka ................... 219/121.82 |
| 6,933,527 B2 | 8/2005 | Isobe et al. .................... 257/59 |
| 6,961,361 B1 | 11/2005 | Tanaka ........................ 372/101 |
| 2002/0094008 A1 | 7/2002 | Tanaka ........................ 372/100 |

(Continued)

*Primary Examiner*—Jordan Schwartz
*Assistant Examiner*—Jessica Stultz
(74) *Attorney, Agent, or Firm*—Eric J. Robinson; Robinson Intellectual Property Law Office, P.C.

(57) ABSTRACT

The present invention provides an optical component for fixing a lens comprising a base, a holder, and a fastener. The base has a concave side surface and at least one first hole. The holder has a cylindrical shape and has a second hole penetrating through a center portion of at least one of the top surface and the bottom surface thereof. The lens is sandwiched between the holder and the part of the base which extends from the edge of the side surface to the inner side and which corresponds to the inner part of a circle drawn so as to circumscribe all the insertion holes. The base and the holder are fastened by the fasteners inserted in the first insertion hole and the second insertion hole.

12 Claims, 4 Drawing Sheets

U.S. PATENT DOCUMENTS

| | | | |
|---|---|---|---|
| 2002/0151121 A1 | 10/2002 | Tanaka | 438/166 |
| 2003/0024905 A1 | 2/2003 | Tanaka | 219/121.6 |
| 2003/0086182 A1 | 5/2003 | Tanaka et al. | 359/719 |
| 2003/0138999 A1 | 7/2003 | Tanaka | 438/166 |
| 2003/0147155 A1* | 8/2003 | Nishikawa | 359/819 |
| 2003/0189769 A1* | 10/2003 | Anderson | 359/819 |
| 2003/0202251 A1 | 10/2003 | Yamazaki et al. | 359/623 |
| 2003/0230749 A1 | 12/2003 | Isobe et al. | 257/59 |
| 2004/0065643 A1 | 4/2004 | Tanaka | 219/121.8 |
| 2004/0214388 A1 | 10/2004 | Tanaka et al. | 438/200 |
| 2005/0035095 A1 | 2/2005 | Yamazaki et al. | 219/121.65 |
| 2005/0098784 A1 | 5/2005 | Isobe et al. | 257/66 |
| 2005/0161742 A1 | 7/2005 | Isobe et al. | 257/347 |

* cited by examiner

FIG. 5A  FIG. 5B  FIG. 5C
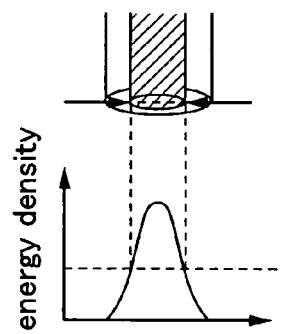 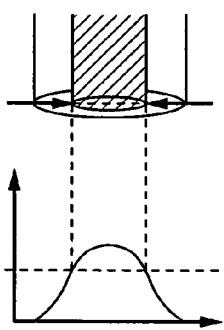 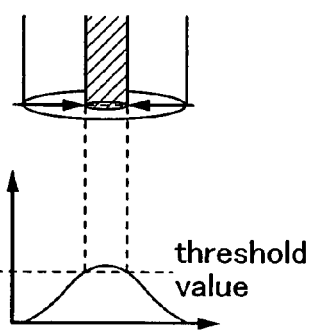
FIG. 5D
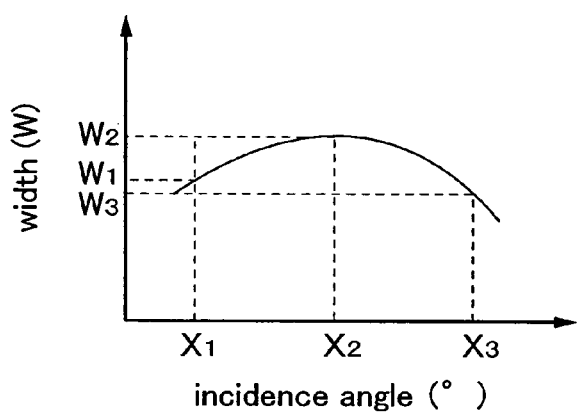
FIG. 5E
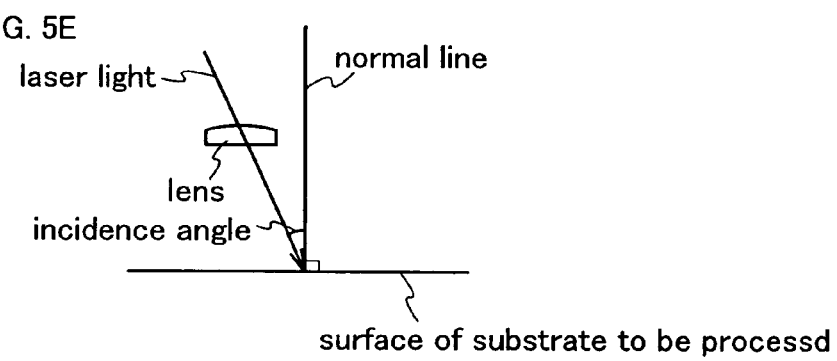

OPTICAL COMPONENT AND LASER IRRADIATION APPARATUS

BACKGROUND OF THE INVENTION

1. Field of the Invention

The present invention relates to an optical component and a laser irradiation apparatus, and more particularly to the optical component for fixing a lens used in an optical system for shaping a laser light, and to a laser irradiation apparatus having the optical component.

2. Related Art

In a step for manufacturing a semiconductor device such as a thin film transistor (TFT), a method in which the laser light is irradiated (a laser annealing method) is employed in the step of crystallization, activation, or the like.

When the laser light is irradiated to a substrate to be processed in the step of manufacturing the semiconductor device, a part of the irradiated laser light becomes reflected light or return light.

When the incident laser light interferes with the reflected light from a rear surface of the substrate by overlapping with each other on the semiconductor film, there are problems that the crystallinity of the semiconductor film becomes inhomogeneous for example in the crystallization step and so on. The inhomogeneous crystallinity of the semiconductor film causes variation of the characteristic of TFT.

In addition, when the reflected light is irradiated to an optical component constituting the laser irradiation apparatus, there are problems that the optical component is damaged and so on. When the dust generated by the damage of the optical component is mixed into the semiconductor film as the impurity, the characteristic of the TFT also varies.

Such a variation of the characteristic of TFT may cause a malfunction of a circuit. Therefore, it has been demanded to develop an apparatus in which the laser light can be irradiated while preventing the interference of the laser light, while preventing the optical component from being damaged, or while minimizing such a damage.

SUMMARY OF THE INVENTION

In view of the above-mentioned problems, it is an object of the present invention to provide a laser irradiation apparatus and an optical component used therein which make it possible to prevent the interference between the incident light and the reflected light from the rear surface of the substrate to be processed and to suppress the damage of the optical component due to the reflected light.

The present invention provides an optical component for fixing a lens comprising a base, a holder, and a fastener. The base comprises a concave side surface having a bent portion and a plurality of first insertion holes. In addition, the holder has a cylindrical shape and has a second insertion hole penetrating through the center portion of at least one of a top surface and a bottom surface thereof. The lens is sandwiched between the holder and a part of the base which corresponds to an inner part from an edge of the side surface and which corresponds to an inner part of a circumscribed circle to all the first insertion holes. And the base and the holder are fastened by the fastener inserted in the first insertion hole and in the second insertion hole.

It is noted that although the holder may be made of a resin material, a metal material, or any other materials, it is preferable to form the holder using the resin material in order to prevent the damage of the lens. As the resin material, tetrafluoroethylene, polypropylene, chlorotrifluoroethylene, and the like are given, the resin material is not limited to these. In addition, it is preferable that the part of the holder in which the side surface thereof intersects with the top surface or the bottom surface thereof and which contacts the lens has curvature. This can prevent the lens from being damaged due to the friction between the holder and the lens in the part where the lens and the holder contact with each other when the lens is sandwiched between the base and the holder.

In addition, a screw, a bolt, or the like can be used as the fastener. Besides, a clipping tool having elasticity may be used.

It is possible to design an optical system not having the optical component in the light path of the laser light reflected on the object to be processed (reflected light) in a case that the lens is fixed using the optical component of the present invention, and that the laser light is irradiated to the object in such a way that the laser light is incident into the lens obliquely. Thus, it is possible to prevent the damage of the optical component caused by the reflected light irradiated to the optical component.

In addition, the present invention also provides a laser irradiation apparatus equipped with the above optical component.

The present invention provides a laser irradiation apparatus comprising a laser oscillator, an optical system including a mirror for adjusting a light path and a lens for shaping a laser light, an optical component for fixing the lens, and a mounting stand. The light path of the laser light emitted from the laser oscillator is adjusted by the mirror, and the laser light is incident into the lens obliquely. Moreover, the optical component is provided so that the base is positioned at the side of the light path of the laser light being incident into the lens. It is noted that a plurality of the mirrors may be provided.

The laser irradiation apparatus described above makes it possible to suppress the interference between the laser light being incident into the object over a substrate and the reflected light from the rear surface of the substrate and to suppress the damage of the optical component caused by the reflected light generated on the object.

In addition, when the semiconductor film is crystallized using such a laser irradiation apparatus described above, it is possible to form a crystalline semiconductor film while suppressing the inhomogeneous crystal condition due to the interference between the incident light and the reflected light from the rear surface of the substrate and while suppressing the mixing of the impurity due to the damage of the mount by the reflected light.

[Advantageous Effect of the Invention]

According to the present invention, it is possible to obtain the laser irradiation apparatus and the optical component which can prevent the interference of the laser light and which can suppress the damage of the optical component due to the reflected light. In addition, by employing the laser irradiation apparatus of the present invention, it is possible to form a crystalline semiconductor film while suppressing the inhomogeneous crystal condition due to the interference between the incident light and the reflected light from the rear surface of the substrate and while suppressing the mixing of the impurity due to the damage of the mount by the reflected light.

BRIEF DESCRIPTION OF THE DRAWINGS

In the accompanying drawings:

FIGS. 5A to 5E are drawings to explain the relation between the incidence angle of the laser light and the width of-the large crystal grain region.

DETAILED DESCRIPTION OF THE EMBODIMENTS

Embodiment Modes

[Embodiment Mode 1]

Figure 1A:
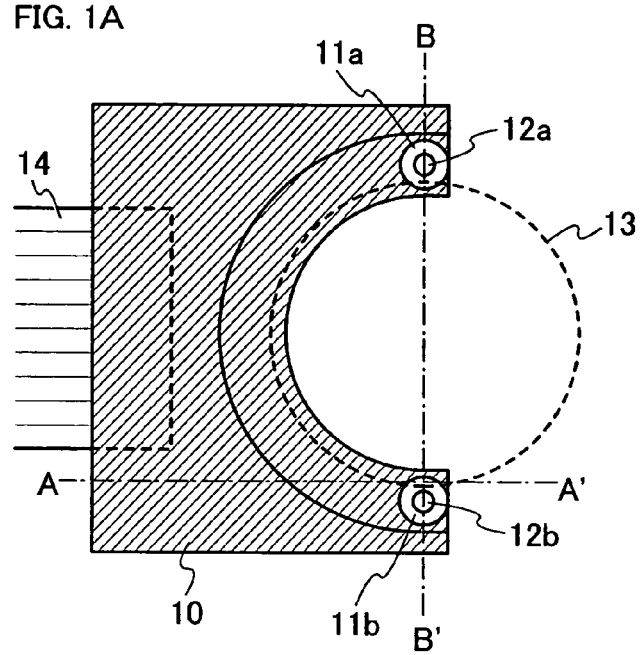
FIGS. 1A to 1C are drawings to explain the optical component of the present invention.
Figure 1B:
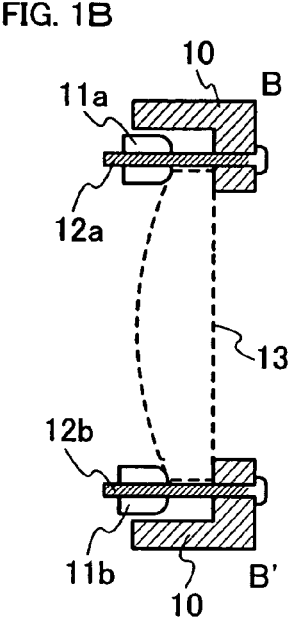
Figure 1C:
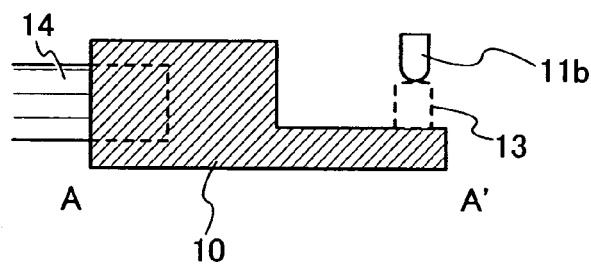
Figure 2:
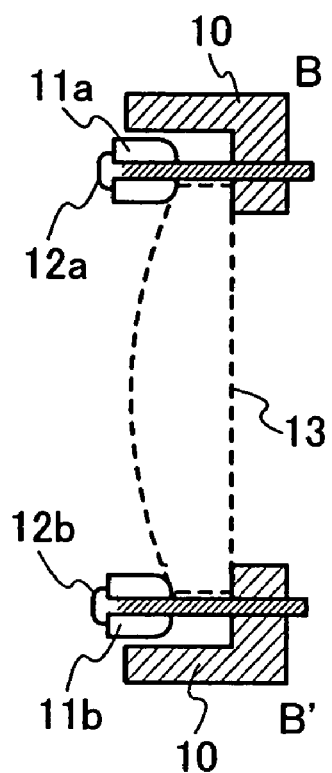
FIG. 2 is a drawing to explain the optical component of the present invention.

An optical component for fixing a lens (mount) is explained as one aspect of the present invention with reference to FIGS. 1A to 1C. It is noted that FIG. 1B is a cross-sectional view taken along B–B' in FIG. 1A, and FIG. 1C is a cross-sectional view taken along A–A' in FIG. 1A.

The present invention provides an optical component comprising a base 10, holders 11a and 11b, and fasteners 12a and 12b. In addition, in the present embodiment mode, it is assumed that convex lens is fixed.

One side surface of the base 10 has a concave shape. In addition, two insertion holes are provided in the base 10. Among surfaces of the base 10, a surface opposing to the holder 11a or 11b is assumed as a first upper surface of the base 10. The part of the first upper surface which corresponds to an inner part from the edge of the concave side surface and which corresponds to the inner part of a circumscribed circle to all the insertion holes functions as a mounting portion where the lens is mounted. It is noted that the shape of the side surface different from the one described above is not limited in particular. In addition, the surfaces of the base 10 may be protected by covering with a film such as alumite. When the alumite is used, it is preferable to use the material not containing carbon such as white alumite.

In addition, the holders 11a and 11b are cylindrical, and an insertion hole is provided in the center portion of the bottom surface thereof (the surface contacting the lens when the lens is fixed). The corner (a part contacting the lens) formed of the bottom surface and the side surface of the holders 11a and 11b has curvature. In addition, the holders 11a and 11b are formed of the resin material such as tetrafluoroethylene, polypropylene, or chlorotrifluoroethylene.

As shown in FIG. 1A, a lens 13 is mounted so that a part of the lens 13 overlaps with a part of the first upper surface of the base 10. The part of the surfaces of the base 10 which overlaps with the lens 13 functions as a mounting portion.

As shown in FIGS. 1B and 1C, the base 10 and the holders 11a and 11b are fastened with the lens 13 sandwiched therebetween by inserting the fasteners 12a and 12b in the insertion hole provided in each of the holders 11a and 11b. On this occasion, the corner formed by the bottom surface and the side surface of the holders 11a and 11b contacts the lens 13. It is noted that the lens 13 can be prevented from being damaged due to the holders 11a and 11b because the corner of the holders 11a and 11b has curvature and the holders 11a and 11b are formed of the resin material. In addition, with the above structure, it is possible to fix the convex lens in particular stably even when it is disposed horizontally. It is noted that not only the convex lens but also a plane lens or a Fresnel lens may be also fixed by the above structure. When a plane lens or the Fresnel lens is fixed, the plane lens or the Fresnel lens is fixed in such a way that the surface of the lens contacts the bottom surface of the holders 11a and 11b.

It is noted that although the base 10 has two fastening portions in which the fasteners 12a and 12b are inserted in this embodiment mode, three or more fastening portions may be provided. In addition, although the head of the fasteners 12a and 12b contacts the bottom surface of the base 10 in this embodiment, the present invention is not limited to this structure. The head of the fasteners 12a and 12b may contact the top surface of the holders 11a and 11b (the surface of the holders 11a and 11b not contacting the lens 13).

Moreover, in the present embodiment mode, the base 10 has a supporting portion 14 for supporting the optical component of the present invention. The supporting portion 14 is installed by inserting it in the base 10. The base 10 is thicker in the part thereof where the supporting portion 14 is installed than in the mounting portion for the lens 13. The base 10, however, may have the same thickness in the part thereof where the supporting portion 14 is installed and in the mounting portion for the lens 13. It is noted that the mounting portion is preferably thick enough to be able to insert the fasteners 12a and 12b easily.

It is thus possible to design an optical system not having the optical component in the light path of the laser light reflected on the object to be processed when the lens is fixed using the optical component of the present invention and the laser light is irradiated to the object to be processed in such a way that the laser light is incident into the lens obliquely. Thus, it is possible to prevent the damage of the optical component caused by the reflected light irradiated to the optical component.

[Embodiment Mode 2]

This embodiment mode explains the optical component of the present invention having different structure from that in the embodiment mode 1.

In this embodiment mode, the optical component of the present invention comprises a pair of bases 30a and 30b, and a fastener 31 and a holder 32 for fastening the pair of bases 30a and 30b.

Figure 3:
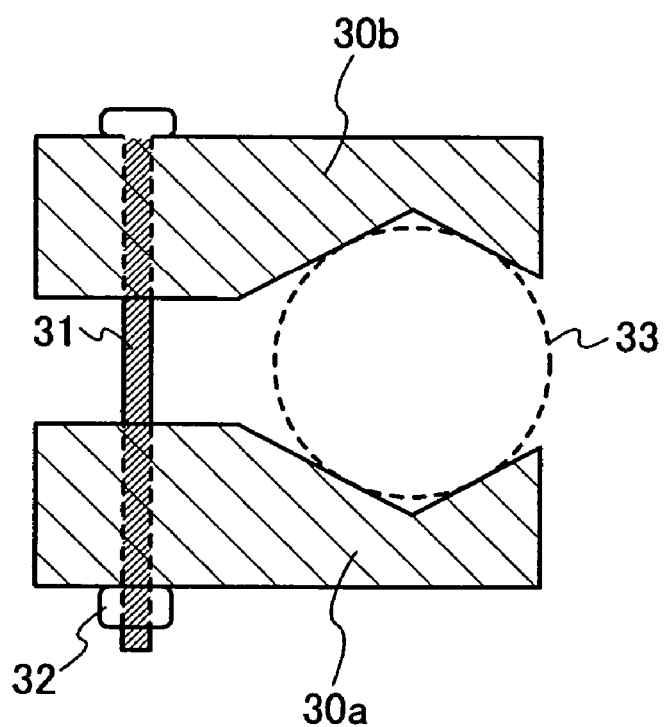
FIG. 3 is a drawing to explain the optical component of the present invention.

In FIG. 3, a lens 33 is fixed in such a way that the lens is sandwiched between the base 30a and the base 30b which are fastened by the fastener 31. It is noted that the side surface of the base 30a and the side surface of the lens 33 contact in two places, and moreover the side surface of the base 30b and the side surface of the lens 33 also contact in two places.

It is noted that a flat plate made of the resin material such as teflon may be provided in the part where the bases 30a and 30b contact the lens 33. This can prevent the lens 33 from being damaged in the part where of the bases 30a and 30b contacting the lens 33.

It is thus possible to design an optical system not having the optical component in the light path of the laser light reflected on the object to be processed when the lens is fixed using the optical component of the present invention and the laser light is irradiated to the object to be processed in such a way that the laser light is made incident into the lens obliquely. Thus, it is possible to prevent the damage of the optical component caused by the reflected light irradiated to the optical component.

Embodiment

[Embodiment 1]

Figure 4:
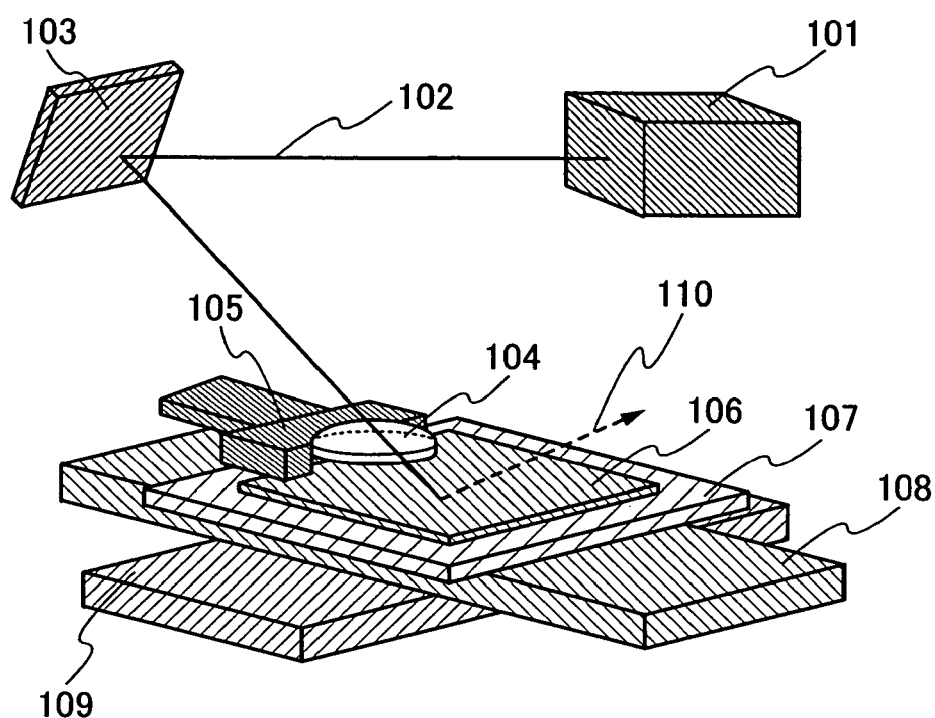
FIG. 4 is a drawing to explain the method of the laser annealing using the laser irradiation apparatus of the present invention.

This embodiment explains a method of laser annealing by using a continuous wave laser irradiation apparatus according to the present invention in order to crystallize the semiconductor film with reference to FIG. 4.

The laser irradiation apparatus according to the present invention comprises a mounting stand 107, a laser oscillator 101, a mirror 103, and a lens 104 for shaping a laser light. The lens 104 is fixed by the same kind of mount 105 as that shown in FIG. 1. Here, the lens 104 is a spherical lens which is convex in the side where the laser light is incident and which is flat in the side where the laser light is emitted. The lens 104 has a diameter of 15 mm, a focal length f of 20 mm, a thickness tc of 5.2 mm in the center, a thickness te of 2.0 mm in the edge, a back focal length fb of 16.6 mm, and a radius of curvature r of 10.38 mm. It is noted that the distance between the substrate 106 to be processed mounted on the mounting stand 107 and the surface of the lens 104 facing the substrate 106 is 12 mm.

An amorphous silicon film is formed over the substrate 106 to be processed and the amorphous silicon film is crystallized by irradiating the substrate 106 with the laser light 102. It is noted that not only the amorphous silicon film but also the other semiconductor film such as an amorphous silicon film including germanium may be employed. In this embodiment, the mounting stand 107 with the substrate 106 mounted thereon is provided on mounting stands 108 and 109 which can move in the horizontal direction. The irradiation position of the laser light changes relative to the substrate 106 to be processed by moving the mounting stands 108 and 109.

The laser light 102 emitted from the laser oscillator 101 is incident into the lens 104 obliquely after adjusting the light path thereof is adjusted by the mirror 103. This can prevent the interference between the incident laser light and the reflected light from the rear surface of the substrate to be processed. It is noted that the laser light 102 is the second harmonic emitted from a Nd:YVO$_4$ laser in this embodiment. The laser light transmitted through the lens 104 has an elliptical beam spot having an aspect ratio (major axis/minor axis) of 10 or more.

The laser light moves in the direction perpendicular to the major axis of the is beam spot relatively from one end of the substrate 106 to the other end thereof. After that, the laser light moves in the direction of the major axis of the beam spot by almost the same length as the major axis of the beam spot. Subsequently, the laser light moves in the direction perpendicular to the major axis of the beam spot relatively from one end of the substrate 106 to the other end thereof. When such an operation is performed repeatedly, the amorphous silicon film provided over the substrate 106 is crystallized.

FIGS. 5A to 5C are charts for showing energy distribution of the laser light when the incidence angles are $x_1°$, $x_2°$, and $x_3°$ respectively all of which satisfy the inequality of $15°<x_1<x_2<x_3<35°$. When the laser light is incident obliquely, as shown in FIGS. 5A to 5C, the energy distribution of the laser light differs according to the incidence angle. For this reason, the size of a beam spot (a large crystal grain region) having the energy density required for obtaining the crystal grain having a size of 10 μm or more also changes according to the incidence angle. It is noted that the major axis of the large crystal grain region is herein referred to as the width of the large crystal grain region. The dependency of the width of the large crystal grain region to the incidence angle is expressed as shown in the chart of FIG. 5D (it is noted that the incidence angle varies in the range of 15° to 35° in the chart) and the width (W) of the large crystal grain region is maximum at a certain incidence angle. It is noted that as shown in FIG. 5E, the incidence angle of the laser light is the angle made by the normal line and the laser light incident into the substrate.

In the optical system having the above structure, the width of the large crystal grain region is maximum when the incidence angle is 26°. Therefore, the incidence angle of the laser light is set to 26° in this embodiment. When the lens having different specification from that described above is used, the incidence angle may be adjusted appropriately. When the laser light is incident at an incidence angle of 26°, the beam spot has an elliptical shape having a size of 20 ì m in the minor axis, and 400 ì m in the major axis.

Thus, it is possible to increase the throughput in the step of the laser irradiation by employing the laser light whose beam spot has a high aspect ratio. Usually, in order to form the laser light whose beam spot has a high aspect ratio, the lens 104 preferably has a short focal length. In the case of shaping the laser light using the lens having a short focal length, however, the mount for fixing the lens comes close to the substrate. In such a case, when the mount for fixing the lens is provided in the light path of the reflected light 110, the reflected light having high energy density is irradiated to the mount, which results in the damage of the mount. In the laser irradiation apparatus according to the present invention, however, the mount for fixing the lens is not provided in the light path of the reflected light. Therefore, the mount can be prevented from being damaged even in the structure where the mount for fixing the lens comes close to the substrate.

As above, when the continuous wave laser irradiation apparatus according to the present invention is used to crystallize the silicon film, it is possible to form a crystalline silicon film while suppressing the inhomogeneity of the crystal condition due to the interference between the incident light and the reflected light from the rear surface of the substrate and while suppressing the mixing of the impurity due to the damage of the mount by the reflected light. Furthermore, in the element using the crystalline semiconductor film such as TFT manufactured using the crystalline silicon film, it is possible to suppress the variation of the characteristic due to the inhomogeneity of the crystal condition or due to the mixing of the impurity into the crystalline silicon film.

It is noted that although this embodiment explained the case in which the laser irradiation apparatus of the present invention is applied in the crystallization step, the laser irradiation apparatus of the present invention may be applied in the activation step or the other step. In any case, it is possible to prevent the mount from being damaged due to the reflected light. In addition, although this embodiment explains the case of using the continuous wave laser irradiation apparatus, a pulsed laser irradiation apparatus may be also employed.

What is claimed is:

1. An optical component for fixing a lens comprising:
   a base having a first hole,
   a holder having a second hole penetrating through a center portion of at least one of a top surface and a bottom surface thereof, and
   a fastener, wherein a lens is sandwiched between the holder and a part of a surface, in which the first hole is provided, of the base, wherein the base and the holder are fastened by the fastener inserted in the first hole and the second hole, wherein the lens has a first portion where the lens is in contact with the base, and a second portion where the lens is not in contact with the base, wherein the first portion is along one portion of an outer peripheral edge of the lens, and the second portion is along another portion of an outer peripheral edge of the lens, and wherein the base is positioned at the side of a light path of a laser light being incident to the lens.

2. An optical component for fixing a lens according to claim 1, wherein the holder comprises a resin material.

3. An optical component for fixing a lens according to claim 1, wherein a part of the holder in which a side surface intersects with the top surface or the bottom surface has curvature.

4. An optical component for fixing a lens comprising:
a base having a concave side surface having a plurality of first insertion holes,
a holder having a cylindrical shape and having a second insertion hole penetrating through a center portion of at least one of a top surface and a bottom surface thereof, and
a fastener,
wherein a lens is sandwiched between the holder and a part of the base which corresponds to an inner part from an edge of the side surface and which corresponds to an inner side of a circumscribed circle to all the insertion holes,
wherein the base and the holder are fastened by the fastener inserted in the first insertion hole and the second insertion hole,
wherein the lens has a first portion where the lens is in contact with the base, and a second portion where the lens is not in contact with the base, and
wherein the first portion is along one portion of an outer peripheral edge of the lens, and the second portion is along another portion of an outer peripheral edge of the lens.

5. An optical component for fixing a lens according to claim 4, wherein the holder comprises a resin material.

6. An optical component for fixing a lens according to claim 4, wherein a part of the holder in which the side surface intersects with the top surface or the bottom surface has curvature.

7. A laser irradiation apparatus comprising:
a laser oscillator,
an optical system including a mirror for adjusting a light path and a lens for shaping laser light,
an optical component for fixing the lens, and
a mounting stand on which a substrate to be processed is mounted,
wherein the optical component comprises:
a base having a concave side surface having a plurality of first insertion holes,
a holder having a cylindrical shape and having a second insertion hole penetrating through a center portion of at least one of a top surface and a bottom surface thereof, and
a fastener,
wherein a lens is sandwiched between the holder and a part of the base which corresponds to an inner part from an edge of the side surface and which corresponds to an inner side of a circumscribed circle to all the insertion holes,
wherein the lens is fixed in such a way that the base and the holder are fastened by the fastener inserted in the first insertion hole and the second insertion hole,
wherein the base is provided outside of a light path being incident into the lens obliquely,
wherein the lens has a first portion where the lens is in contact with the base, and a second portion where the lens is not in contact with the base, and
wherein the first portion is along one portion of an outer peripheral edge of the lens, and the second portion is along another portion of an outer peripheral edge of the lens.

8. A laser irradiation apparatus according to claim 7, wherein the holder comprises a resin material.

9. A laser irradiation apparatus according to claim 7, wherein a part of the holder in which the side surface intersects with the top surface or the bottom surface has curvature.

10. An optical component for fixing a lens according to claim 1, wherein surfaces of the base are protected by covering with a film such as white alumite.

11. An optical component for fixing a lens according to claim 4, wherein surfaces of the base are protected by covering with a film such as white alumite.

12. A laser irradiation apparatus according to claim 7, wherein surfaces of the base are protected by covering with a film such as white alumite.

* * * * *